Figure 7:
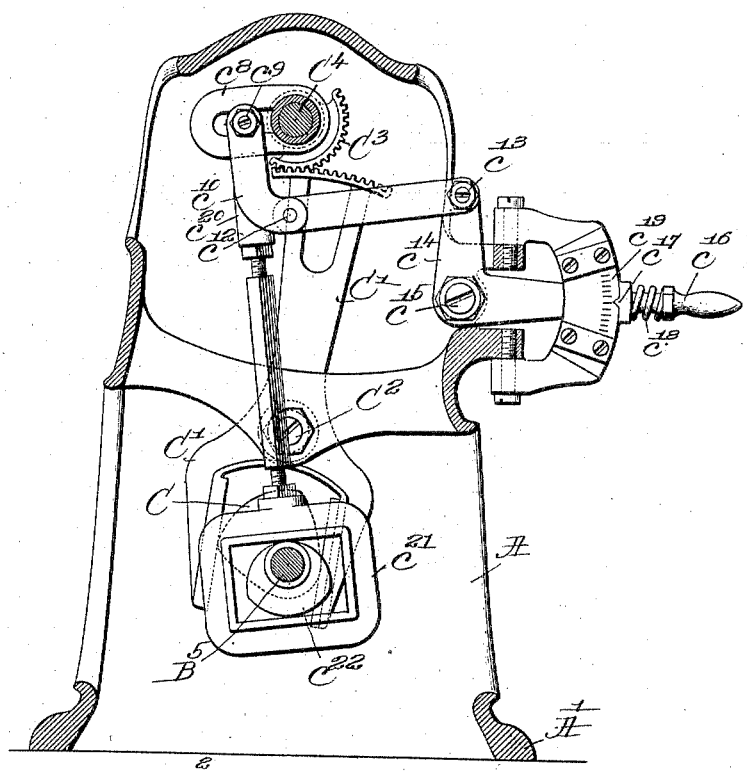

No. 811,839. PATENTED FEB. 6, 1906.
P. R. GLASS.
MACHINE FOR SETTING LACING HOOKS OR STUDS.
APPLICATION FILED OCT. 23, 1903.
5 SHEETS—SHEET 1.
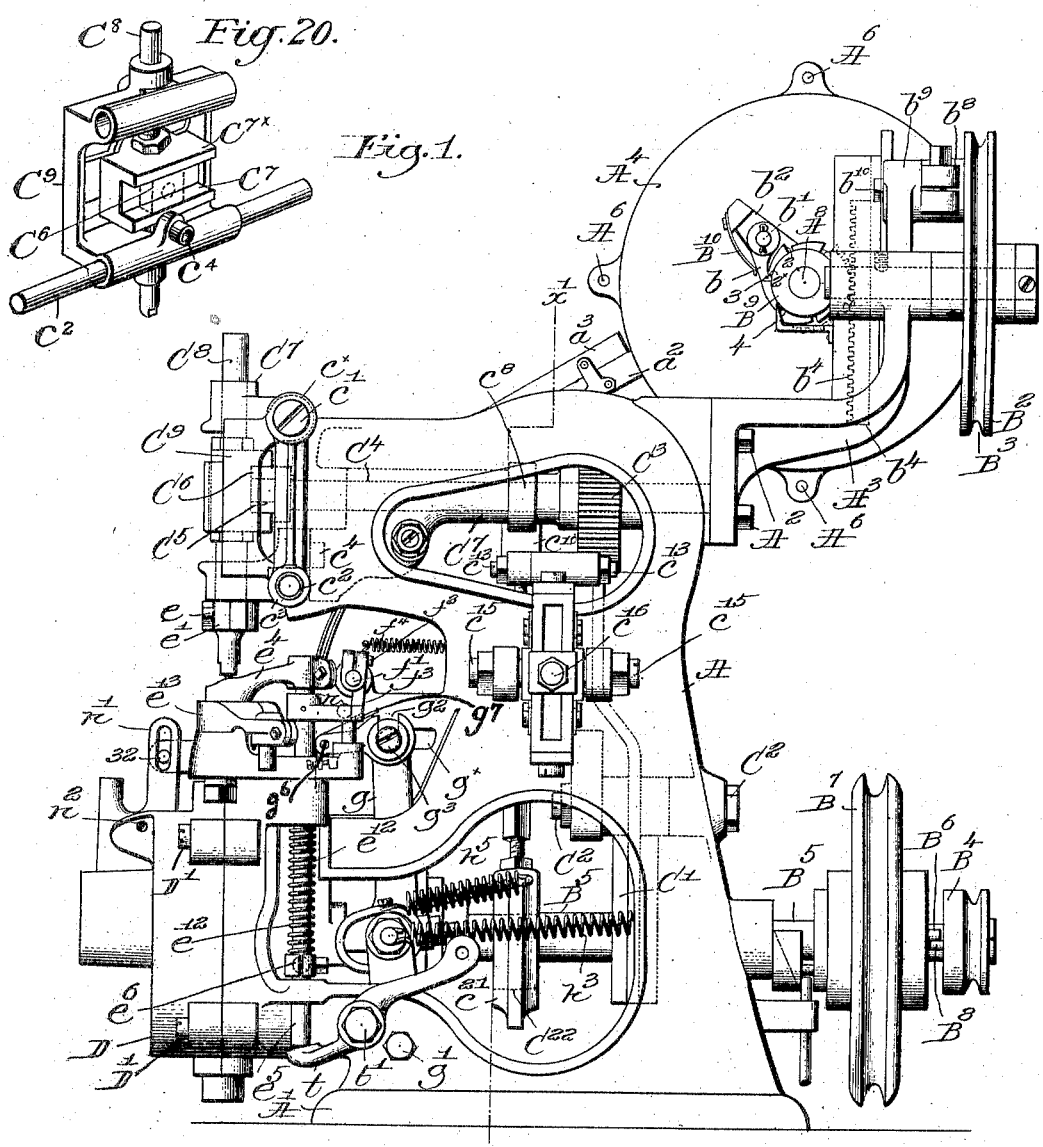
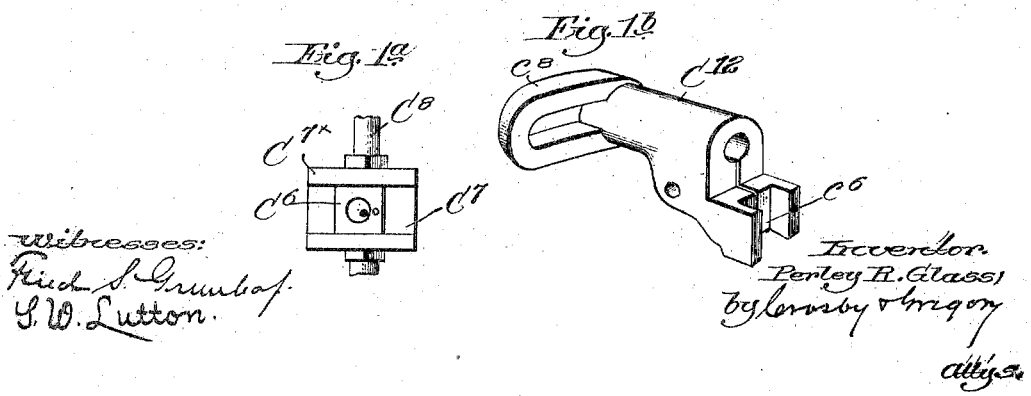

No. 811,839. PATENTED FEB. 6, 1906.
P. R. GLASS.
MACHINE FOR SETTING LACING HOOKS OR STUDS.
APPLICATION FILED OCT. 23, 1903.
5 SHEETS—SHEET 2.
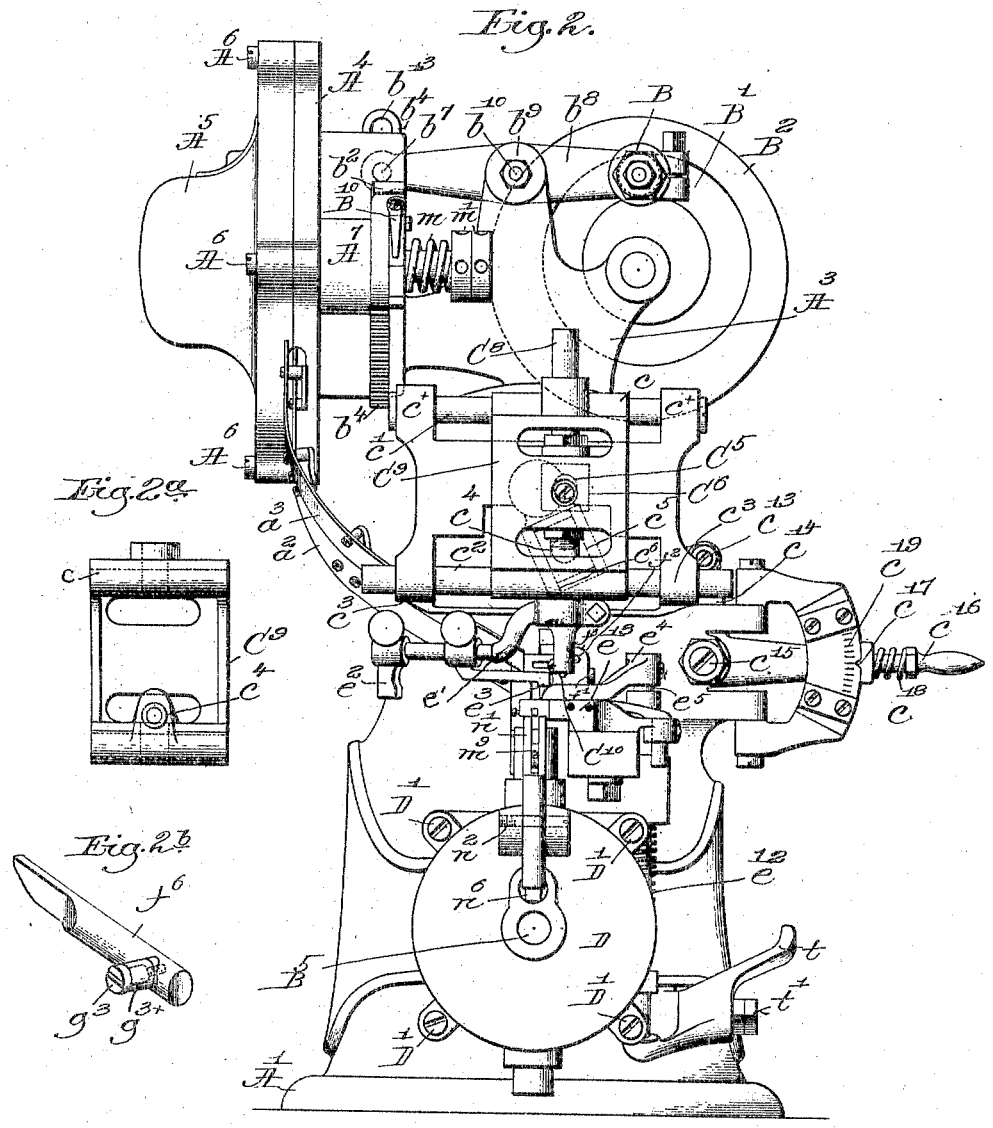
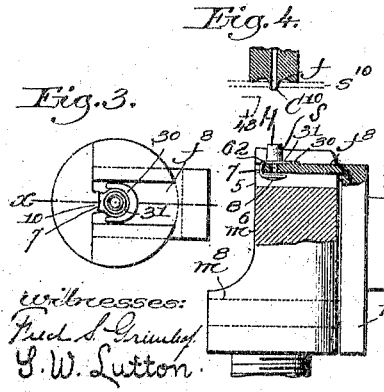
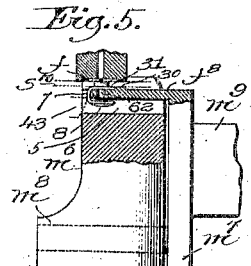
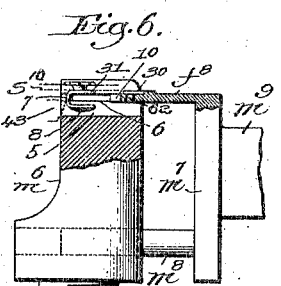

No. 811,839. PATENTED FEB. 6, 1906.
P. R. GLASS.
MACHINE FOR SETTING LACING HOOKS OR STUDS.
APPLICATION FILED OCT. 23, 1903.

5 SHEETS—SHEET 3.

Witnesses:
Fred S. Greenleaf
S. W. Lutton

Inventor
Perley R. Glass,
by Emery & Emery
attys

No. 811,839. PATENTED FEB. 6, 1906.
P. R. GLASS.
MACHINE FOR SETTING LACING HOOKS OR STUDS.
APPLICATION FILED OCT. 23, 1903.
5 SHEETS—SHEET 4.
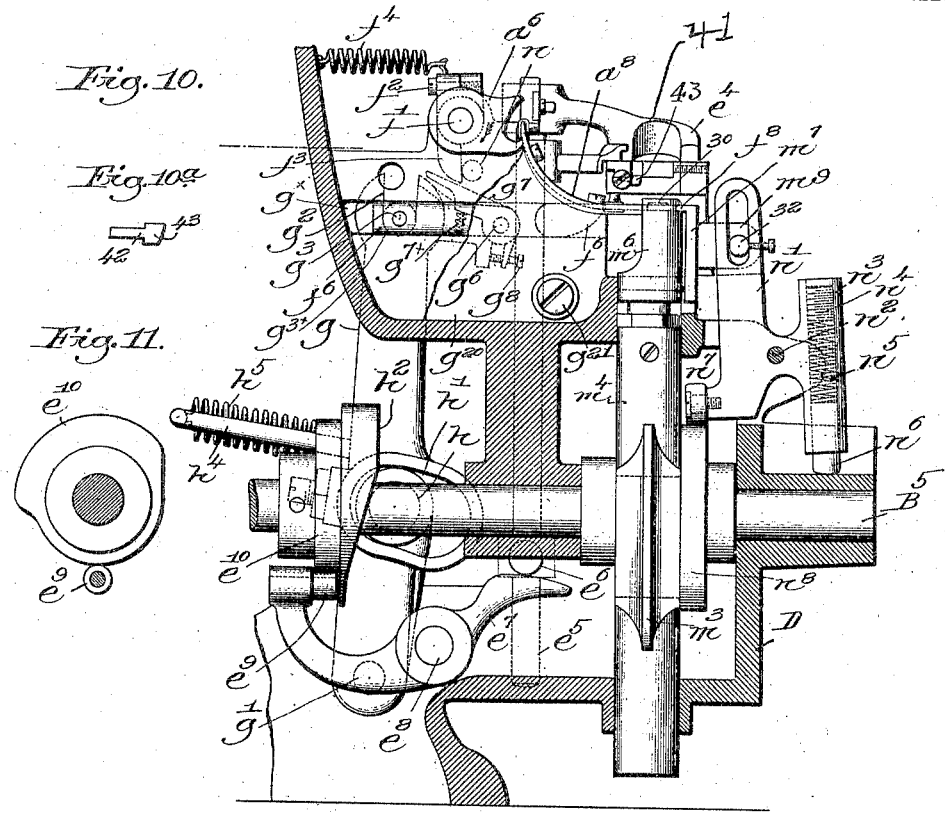
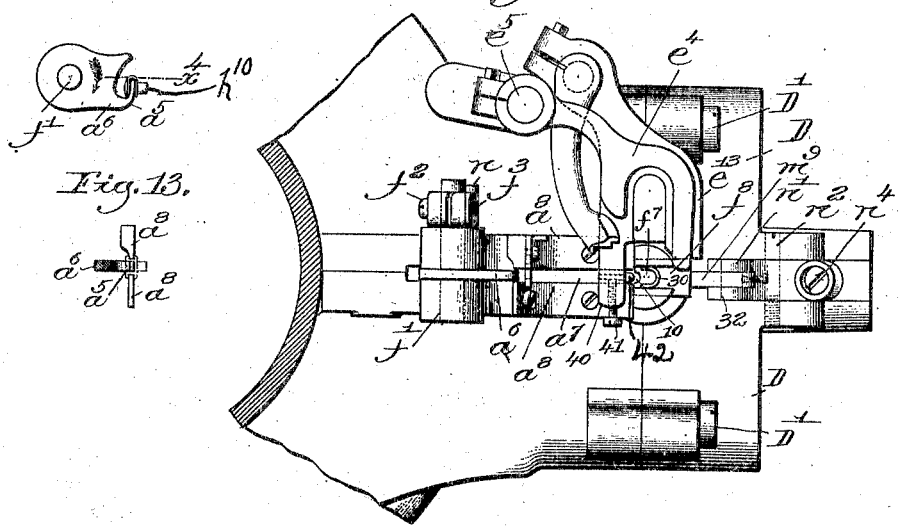

No. 811,839. PATENTED FEB. 6, 1906.
P. R. GLASS.
MACHINE FOR SETTING LACING HOOKS OR STUDS.
APPLICATION FILED OCT. 23, 1903.
5 SHEETS—SHEET 5.
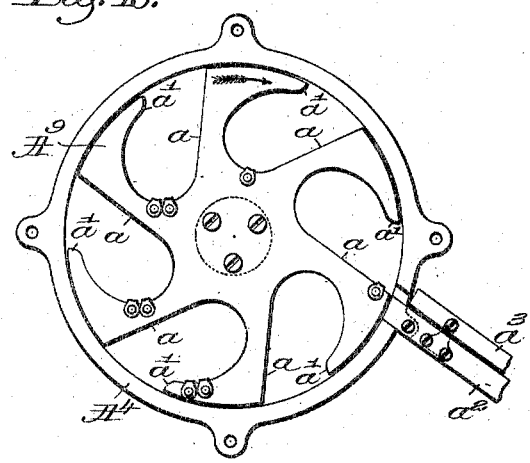
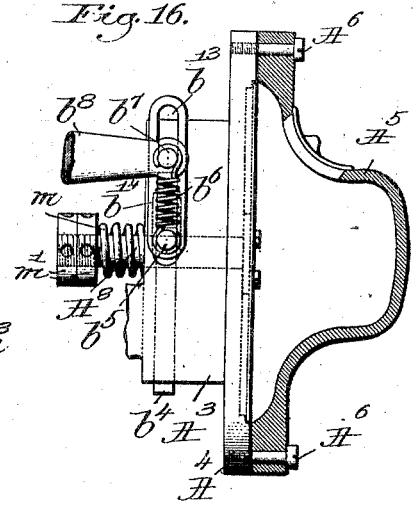
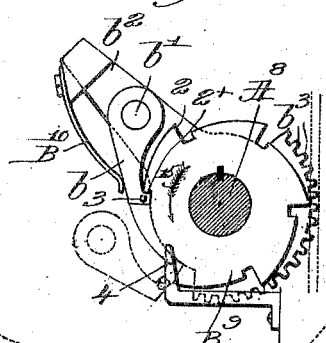
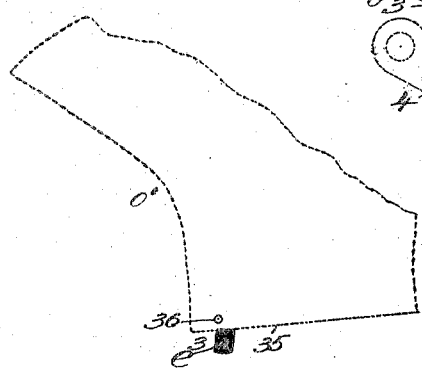
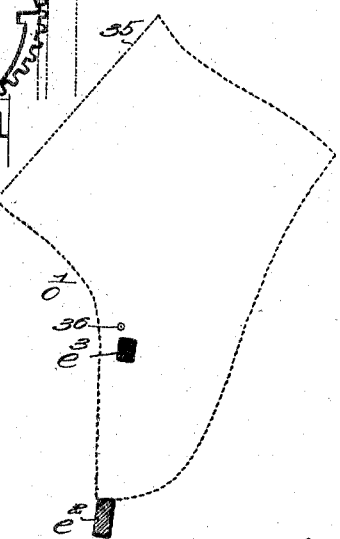
Witnesses:
Fred. S. Greenleaf
S. W. Sutton
Inventor:
Perley R. Glass,
by Crosby & Gregory
Attys.

UNITED STATES PATENT OFFICE.

PERLEY R. GLASS, OF QUINCY, MASSACHUSETTS, ASSIGNOR TO THE PEERLESS MACHINERY COMPANY, OF BOSTON, MASSACHUSETTS, A CORPORATION OF MASSACHUSETTS.

MACHINE FOR SETTING LACING HOOKS OR STUDS.

No. 811,839.   Specification of Letters Patent.   Patented Feb. 6, 1906.

Application filed October 23, 1903. Serial No. 178,241.

*To all whom it may concern:*

Be it known that I, PERLEY R. GLASS, a citizen of the United States, residing at Quincy, in the county of Norfolk and State of Massachusetts, have invented an Improvement in Machines for Setting Lacing Hooks or Studs, of which the following description, in connection with the accompanying drawings, is a specification, like letters on the drawings representing like parts.

This invention has for its object to provide a novel machine for setting in stock lacing-hooks having hollow shanks and feeding the stock automatically after the insertion of each hook.

The machine described includes, among its essential features, a hopper to contain hooks, a raceway on which said hooks are strung from the hopper, a separator to feed the hooks separately to a delivery-raceway, a setting-plunger provided with a slidable hook-sustaining plate movable substantially at right angles to the longitudinal axis of said plunger, said hook-sustaining plate having coacting therewith means to cause said plate to enter the throat of the hook prior to setting the same and to be withdrawn from the throat of the hook after the hook has been set, and a punch having a clenching-surface, said punch being moved while in the stock to thus feed the same into position to receive another hook of the series of hooks to be set. The parts referred to are so actuated that when the punch occupying a position in the hole punched by it in the stock is moved and brought in line with the hollow shank of a hook the movement of the plunger and hook sustaining plate causes the hollow shank of the hook to be thrust into the hole in the stock and embrace the punch yet in the stock, said shank being then thrust through the stock until it meets the clenching-surface connected with and forming part of the punch, said surface expanding the shank and setting the hook in the stock. The hook-sustaining plate is shown as provided at its upper side with a setting-pocket to receive and position the head of the hook and also as having a notch to embrace the neck of the hook. The hook-sustaining plate occupies a position in the throat of the hook while the latter is being set in the stock and resists, as an anvil, the pressure of the clenching-surface in upsetting or flanging the shank of the hook, thus preventing the closing of the throat of the hook while setting the shank thereof in the stock. By mounting the hook-setting plate on the reciprocating plunger and moving said plate only in a line at right angles to the longitudinal axis of the plunger the plate may be withdrawn freely from the throat of the said hook without any tendency whatever of opening the throat of the hook, which would be the case were the hook-setting plate moved in the arc of a circle. The means for actuating the separator is so constructed that the separator cannot be moved to deliver a hook to the delivery-raceway if the hook-sustaining plate then in hook-receiving position contains a hook, such provision preventing injury to the hook-feeding device employed to place the hook on said hook-sustaining plate and obviating damage to the plate and raceway. The lever of the separator-actuating means carries a spring-pressed pawl and is moved by a radius-bar having a stud acted upon by a cam, the stud being kept in contact with said cam by a spring. The radius-bar is also connected with the lever carrying said pawl by a spring that permits the lever to be arrested in its forward movement should the hook-feeding device, moving in unison with the lever, be arrested by an improperly-lodged or imperfect hook. The lever referred to is not actuated positively, but is moved by a spring in the direction to cause its pawl to actuate the separator. The hooks are fed onto the hook-sustaining plate by a hook-feeding device, and in case a second hook should accidentally enter the delivery-raceway before a hook straddling the hook-sustaining plate and next to be set is discharged from said plate the pawl referred to in the backward movement of said lever preparatory to again actuating the separator to deliver a hook to the hook-sustaining plate will not be moved far enough to pop up behind and engage a dog carried by the separator-shaft for the reason that the hook-feeding device then in contact with the extra hook will arrest the forward movement of the lever and its pawl, and consequently the separator will not be moved until after the hook last supplied to the receiving end of the hook-setting plate has been set into the stock. The hook-lifter located in the hopper is moved intermittingly by a rack-bar that turns the lifter in its forward direction to deliver hooks by or through the action of a spring connected with an actuating-lever. This spring permits the lever to move without moving the rack-bar and lifter provided a hook becomes jammed in the hopper at the point where the lifter discharges its hooks onto the raceway. This yielding of the lever and arresting of the rack is an important feature of this invention.

Prior to this invention in hook-setting machines it has always been customary to make holes in the stock by a punch and to then place the punched stock by hand in the hook-setting machine, placing each punched hole in succession over the point of the top set, and while the hook is held by the plunger its hollow shank has been forced through the stock and against the top set. So also it has been common to force the shank of the hook through the stock, feeding the latter by hand; but this class of machine is used only in connection with very cheap work and is unreliable, because the spacing of the hooks, due to feeding the stock by hand, can be determined only by the eye of the operator, which results in a lack of uniformity in the spacing of the hooks that is readily discernible and disfigures the work.

All prior machines for setting lacing-hooks have been limited in their action to setting from one hundred and twenty-five to one hundred and forty hooks per minute; but in the machine herein to be described it is possible to set hooks practically at the rate of four hundred and eighty to five hundred per minute. This great gain in the number of hooks set flows from the fact that the punch after punching the stock is immediately moved to feed the stock automatically and uniformly into line with the plunger and the fact that the hook-sustaining plate guided by the plunger and made movable therein at right angles to the axis of the plunger may be moved rapidly and withdrawn from the throat of the set hook without friction and without liability of opening the hook.

The machine herein to be described is shown as provided with a novel system of gages which are movable with the punch and the slide-frame carrying the same as the punch acts to feed the stock, the stock being abutted against said gages, as will be described, preparatory to setting the first of a series of hooks therein, said gages insuring the proper position for the first hook of the series, the automatic feeding of the stock thereafter spacing the hooks uniformly apart.

The reciprocating plunger herein shown and described, together with the hook-sustaining plate carried thereby and movable transversely of the longitudinal axis of said plunger in one direction to place the plate in position to receive from the usual raceway a hook to be set and then in the opposite direction to withdraw the plate from the set hook, are shown and claimed, broadly, in my co-pending application, Serial No. 163,470, filed June 29, 1903, wherein I have made an affidavit under Rule 75 to antedate a patent bearing date of July 28, 1903. So herein the plunger and hook-sustaining plate, both of my invention, enter into combination with other essential features of a hook-setting machine that I did not illustrate in my said application.

Figure 8:
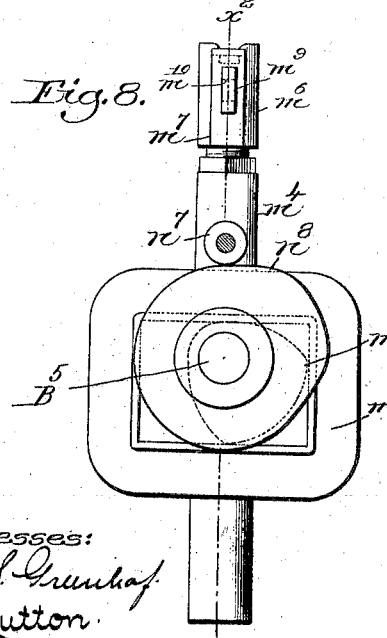
Figure 9:
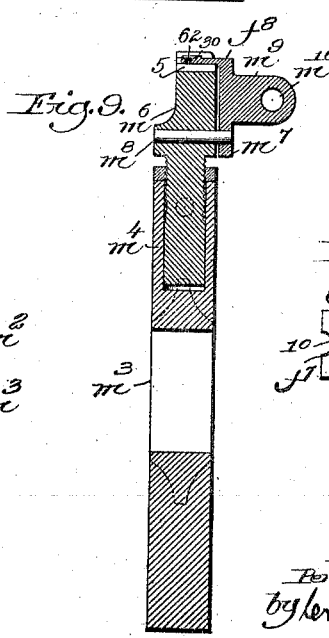
Figure 9A:
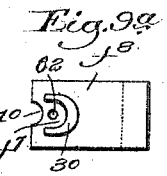

Figure 1 in side elevation represents a hook-setting machine embodying my present invention in one of the best forms now known to me. Fig. 1$^a$ is an inside view of the slide-block and part of the punch-bar; Fig. 1$^b$, a view of the casting C$^{12}$ detached. Fig. 2 is a front elevation of the machine shown in Fig. 1; Fig. 2$^a$, an inside view of the sliding frame C$^9$. Fig. 2$^b$ shows the plunger detached. Fig. 3 is a top view enlarged of the hook-sustaining-plate, means for supporting it, and a lacing-hook held thereby. Fig. 4 is a section thereof in the line $x$, together with the punch, the hook-sustaining plate and plunger being shown in its lowered position. Fig. 5 is a view like Fig. 4, with the hook-sustaining plate and its plunger raised and the shank of the hook set in the stock. Fig. 6 is a detail like Fig. 5, showing the punch elevated and the hook-sustaining plate withdrawn preparatory to the descent of the plunger and plate in its hook-receiving position. Fig. 7 is a section in the line $x'$, Fig. 1. Fig. 8 is a front view of the hook-sustaining plate and means for carrying the same together with its actuating-cam. Fig. 9 is a section in the line $x^2$, Fig. 8, the cam and its shaft being omitted;
Fig. 9$^a$, a top view of the hook-sustaining plate detached. Fig. 10 is a vertical sectional detail of the front portion of the machine, chiefly to show the separator and plunger and the novel means for actuating the same, together with the hook-sustaining plate and means carrying the same. Fig. 10$^a$ shows the hook-seater 42 detached. Fig. 11 is a detail of the cam for raising the presser-foot. Fig. 12 is a detail showing a part of the separator with a hook in position thereon. Fig. 13 shows part of the separator and hook in the section-line $x^4$, Fig. 12, together with the raceway over which the hook slides from the separator on its way to the hook-sustaining plate. Fig. 14 is a plan view looking down upon the hook-sustaining plate, the lower raceway, separator, upper guide, and presser-foot. Fig. 15 is an interior view of the hopper and hook-lifter, together with parts of the upper ends of the raceway. Fig. 16 is a vertical section through the hopper looking at the same from the rear of the machine. Fig. 17 is a detail of the pawl and pawl-carrier instrumental in moving the hook-lifter intermittingly. Fig.

18 and 19 show in section gages coacting with left and right hand sides of the top of a shoe in which the hooks are to be set, and Fig. 20 is a detail to be referred to.

The framework A of the machine is and may be of any suitable shape to sustain the working parts, said framework having a foot or base A' to stand on a bench or other suitable support. The upper part of the framework has secured to it by bolts $A^2$ a stand $A^3$, a portion of which is of substantially circular shape, as at $A^4$, to constitute a part of the hopper to receive the hooks, the other part of the hopper being a hat-shaped plate $A^5$, that is united to the part $A^4$ by suitable screws $A^6$. The stand $A^3$ has a suitable bearing $A^7$, that receives a shaft $A^8$, having secured to it within the hopper a hook-lifter $A^9$, shown as having several arms (see Fig. 15) that in the rotation of the shaft $A^8$ engage the lacing-hooks thrown indiscriminately into the hopper and lift the same, the rotation of the lifter in the direction of the arrow, Fig. 15, gradually bringing the straight edges $a$ of said arms in position to enable the hooks picked up by the points $a'$ thereof to pass from said straight edges onto the receiving end of a raceway-rail $a^2$, down which rail said hooks slide and on which they are strung and kept from falling off by a top rail $a^3$. The rail $a^2$ is shown in Fig. 2 as curved and as having coacting with its end a separator $a^6$, and the hooks travel along this rail to the end thereof and are finally delivered therefrom, as represented in Fig. 12, upon a finger $a^5$ of said separator, to be described, said finger at that time standing in line with the space $a^7$ of the delivery-raceway $a^8$. The shaft $A^8$ is rotated intermittingly by or through a hooked pawl $b$, pivoted at $b'$ on a pawl-carrier $b^2$, one end of which is mounted loosely on said shaft. The pawl-carrier has a series of teeth $b^3$, (see Fig. 17,) that are constantly in mesh with the teeth of a rack-bar $b^4$, said bar deriving its movement through a stud $b^7$, carried by a lever $b^8$, said stud entering a slot in a link $b^{13}$, jointed by a stud $b^5$ to said rack. The stud $b^5$ is embraced by a spring $b^6$, the upper end of which is connected with the stud $b^7$, said spring giving way and letting the lever $b^8$ move should a hook be caught and held imperfectly, thus obviating damage to said hook. The outer end of the lever $b^8$ (see Fig. 2) has a roller or other stud B, that enters a cam-groove B' in a cam-block $B^2$, provided with a groove $B^3$, (see Fig. 1,) that receives a belt (not shown) that embraces a small belt-pulley $B^4$, mounted loosely on the main shaft $B^5$ and driven when desired by or through a pin $B^6$, driven by the loose pulley $B^7$ of the clutch variety mounted on said shaft, said pin engaging a pin $B^8$ on the wheel $B^4$. When the pins are engaged as in Fig. 1, the rack is reciprocated to move the pawl, so that it engages one notch after another of a ratchet-wheel $B^9$, (shown in Fig. 17 as having six notches,) thus moving the lifter that its blades may pick up the hooks. A spring $B^{10}$ acts normally to keep the pawl $b$ in its operative engagement with the ratchet-wheel fast on the shaft $A^8$. The shape of the notches in the ratchet-wheel $B^9$ is peculiar—that is, one side of each notch, as 2, is longer than the opposite side—and the right-angled toe $2^\times$ of the pawl enters the notch, and when the pawl is moving the ratchet regularly to turn the carrier in the direction of the arrow 15 the end of the pawl abuts the longer side 2 of each notch, and at the extreme end of the movement of the pawl-carrier a pin 3 on the pawl meets a finger 4, sustained from the head of the machine, and releases the pawl from the notch, so that as the pawl-carrier is reversed in its movement, the rack then descending, the pawl will ride up over the cam-shaped outer edge of the tooth and again enter the next notch, provided a hook has not been improperly lodged on the lifter and has stopped its movements. The distance from one to the next notch of the ratchet-wheel 15 on the shaft carrying the hook-lifter is such that the pawl-carrier must have a full stroke between engaging one and the next notch. In case of obstruction the spring $b^6$, Fig. 16, yields to the upward movement of the end of the lever $b^8$, with which it is connected, and stops the further movement of the rack-bar and lifter; but as the end of the lever $b^8$ having the stud $b^7$ descends said stud acts against the lower end of the slot $b^{13}$, moves said rack-bar downwardly, and if the pawl-carrier did not complete its full forward stroke, and yet engages the same notch in the ratchet-plate, it follows that the hook-lifter is turned backwardly and will not be again turned forwardly to engage another tooth until the hook which was improperly lodged and caused the stoppage is removed. To prevent undue movement of the lifter and its blades, the shaft is surrounded by a friction-spring $m$ in contact at one end with suitable adjusting-nuts $m'$.

The main shaft $B^5$ has fast on it inside the framework a triangular cam C, that rotates inside the forked lower end of a lever C', having its fulcrum at $C^2$. The upper end of this lever is made as a toothed sector that engages a segment $C^3$, fast on the upper shaft $C^4$, said shaft having its bearings in the frame and being provided at its front end with a disk provided with a roller-stud $C^5$, that enters a slide-block $C^6$, (see Fig. $1^a$,) that is fitted to slide in a horizontal guideway $C^7$ in a cross-piece $C^{7\times}$, fast on the punch-bar $C^8$, the latter being reciprocated in a bearing in a slide-frame $C^9$, to be described, that the punch $C^{10}$ at the lower end of said bar may descend upon the stock and punch a hole therein at the desired times. The slide-frame $C^9$ has a long sleeve-bearing $c$ at its upper end that fits loosely over a guiding-rod $c'$, held in suitable ears $c^x$ of the head of the framework, a tubular portion at the lower end of the frame $C^9$ having fast to it a rod $c^2$, the ends of which slide freely in ears $c^3$, forming part of the head of the machine. The slide-frame $C^9$ at its inner side (see Fig. 2) has a stud $c^4$, that receives a block $c^5$, that enters a vertical guideway $c^6$ at the end of a casting $C^{12}$, (see Fig. $1^b$,) mounted loosely on the shaft $C^4$. This casting has a projecting slotted arm $c^8$, (see Figs. 7 and $1^b$,) that is entered by a stud $c^9$, carried by a slide $c^{10}$, forming part of the stock-feeding means, said slide having connected therewith at $c^{12}$ a link in turn jointed at $c^{13}$ to one arm of an adjusting-lever $c^{14}$, pivoted at $c^{15}$, the opposite end $c^{16}$ of said lever being adjustable and having a point $c^{17}$ controlled by a spring $c^{18}$, said point coacting with a scale $c^{19}$, the adjustment of this lever positioning the stud $c^9$ in the slot of the arm $c^8$ and producing a longer or shorter stroke of the slide-frame, and consequently a longer or shorter feed-stroke of the punch. The lever $c^{10}$ forms part of a head $c^{20}$, adjustably connected with a frame $c^{21}$, inside of which is a cam $c^{22}$, that in the rotation of the shaft $B^5$ causes the lever to rise and fall and moves the sleeve for actuating the slide-frame a greater or less distance, according to the distance required between one and the next hook to be set.

The punch has clamped to it by a bolt $e$ the split end of a gage-carrying arm $e'$, to which are adjustably applied two gages $e^2$ and $e^3$, the gage $e^3$ being shown as the shorter, said arm and gages partaking of the to-and-fro movements of the slide-frame $C^9$.

The presser-foot $e^4$ is clamped upon the upper end of a rod $e^5$, having a stud $e^6$, that is acted upon by one end of a lever $e^7$, pivoted at $e^8$, the opposite end of said lever having a roller-stud $e^9$, that is acted upon by a cam $e^{10}$, the cam being of such shape as to lift the presser-foot when the punch is in the stock and feeding the same, and at all other times the presser-foot is held down upon the stock on the stock-support by means of a spring $e^{12}$. (See Fig. 2.) The workman may lift the rod $e^5$ and presser-foot when desired by the treadle-lever $t$, pivoted at $t'$.

The stock rests on the stock-support $e^{13}$ (see Fig. 1) while the punch acts to punch a hole in the stock and is moved laterally to feed and place the stock in position immediately over the hollow shank $s$ of the hook H, held by the hook-sustaining plate, so that as the latter holding the hook firmly is raised it will push the end of said shank into the hole in the stock yet occupied by the punch, causing the shank of the hook to embrace the punch, pass through the stock, and meet the clenching-surface $f$, the latter acting to flange or turn over, as in Figs. 5 and 6, the end of the shank of the lacing-hook and set the same in the stock, after which while the stock is clamped the punch rises, and by a movement of the carriage the punch is returned to its starting-point. The hook-sustaining plate is withdrawn from the throat of the hook and is lowered into its starting position.

The separator $a^6$ is fast on or forms part of a shaft $f'$, (shown by dotted lines, Fig. 14, and full lines in Fig. 10,) having a suitable bearing in the framework. The right-hand end of said shaft has clamped upon it by a clamp-screw $f^2$ a dog $f^3$, said dog being adjusted on the shaft to position accurately the separator-finger $a^5$ with relation to the throat $a^7$, leading into the delivery-raceway $a^8$ to accommodate the hook to be fed therein. The normal position of said separator is determined by a spring $f^4$, connected with the frame of the machine and with the upper end of the dog $f^3$, (see Fig. 10,) the lower end of the dog meeting in its normal position a stud or stop $n$, supported by the framework. The finger of the separator has to be withdrawn from the hook in order that the hook may slide off and enter the groove of the delivery-raceway to be acted upon by the hook-feeding device $f^6$, the forward end of which meets the hook in the throat $a^7$ after the same has been dropped from the finger of the separator (see Fig. 10) and pushes said hook directly into the setting-pocket $f^7$, forming a part of the hook-sustaining plate $f^8$. The separator is moved to deliver hooks to the hook-sustaining plate one at a time by or through the action of the lever $g$, pivoted at its lower end on a stud $g'$ and provided at its upper end with a notch $g^2$, that receives a roller-stud $g^{3\times}$, (see Figs. 1 and $2^b$,) carried by a screw $g^3$, that extends through a slot $g^x$, Fig. 1, of the framework. The stud $g^{3\times}$ enters a threaded hole in the hook-feeding device $f^6$, said stud and slot guiding said feeding device as the latter is moved between the framework and plate $g^{20}$, held in place by a screw $g^{21}$, said plate being partially broken out in Fig. 10. The hook-feeding device in its movements meets the hooks singly and places them one by one in the setting-pocket of the hook-sustaining plate. The lever $g$ derives its motion from a roller-stud $h$ of a radius-bar loose on the stud $g'$. The stud $h$ is extended through an elongated slot $h'$ of the lever $g$ and is acted upon by the face of a cam $h^2$. The stud of the radius-bar is kept in contact with said cam by a spring $h^3$. The radius-bar is yieldingly connected with a rod $h^4$, extended from the lever $g$, by a spring $h^5$, and it will thus be seen that said lever $g$ is operated yieldingly in both directions, which enables the lever to cease moving whenever the hook-feeding device is stopped by an improperly-lodged hook or the separator is clogged and its proper movement restricted. The upper end of the lever $g$ has extended from it an arm upon which is pivoted at $g^6$ a separator-moving pawl $g^7$, (shown best in Figs. 1 and 10) and acted upon by a compressed spring $g^{7\times}$, sustained in a hole in said projecting arm, said spring serving normally to lift the end of the pawl to an extent determined by an adjusting device, shown as a set-screw $g^8$, extended from the short arm of said pawl and abutting a depending ear of said arm. When the upper end of the lever $g$ is moved to the right, Fig. 1, the pawl meets the dog $f^3$ and turns the separator in the direction of the arrow, Fig. 12, to withdraw its finger from the throat of the hook in case the separator is not clogged, and on the return of the lever the lower end of the dog meets and depresses the pawl, so that the pawl may pass the dog and immediately rise in front of the same ready for another operation. The pawl and the hook-feeding device are each moved by the same lever $g$, the lever when moved in one direction turning the separator to discharge a hook and when moved in the opposite direction moving the hook-feeding device to act on a hook in the throat $a^7$ and feed the same onto the hook-sustaining plate, to be described, and the length of the pawl and the length of the plunger are such that if the plunger is arrested before it completes its full active stroke the inactive or return stroke of the pawl will be arrested, and as a result the pawl will not be put in its operative position in front of the dog $f^3$. For instance, if a hook should be dropped by the separator into the throat $a^7$ and the hook-feeding device in its forward movement should meet said hook and there should yet be a hook on the hook-sustaining plate, said hook not having been discharged from said plate, the second or intruding hook will strike against the hook yet held in the setting-throat and will be arrested before the pawl on its return or inactive stroke is moved fully past the dog $f^3$. Arresting the further movement of the separator under such circumstances prevents the discharge of another or intruding hook into the throat. This is a matter of very great importance in hook-setting machines and enables the separator to feed hooks unerringly one at a time to the throat $a^7$ and to feed said hooks to said throat only at the proper time and after the hook-feeding device has made a full stroke and deposited a hook on the hook-sustaining plate. The hook-feeding device having been arrested by a hook yet on the hook-sustaining plate, the separator will not be again moved until the hook on the hook-sustaining plate has been disposed of.

The front end of the main shaft $B^5$ is provided with a triangular cam $m^2$, that enters a hollow yoke $m^3$, forming part of the spindle or plunger $m^4$, carrying the hook-sustaining plate $f^8$. The spindle or plunger is composed of a plurality of parts which are adjustable to place the hook-sustaining plate at exactly the proper height with relation to the descent of the anvil and punch. The upper portion or head $m^6$ of the spindle or plunger is slotted to form a space 5, having side walls grooved at 6 to form a guideway for the reception of the edges of the hook-sustaining plate, the end of which crosses the slot in the plunger. The hook-sustaining plate shown has a setting-pocket $f^7$ at its upper side and extended but partially through said plate, (see Figs. 3 to 6,) where said pocket is shown as formed by recessing a projection 30 at the upper side of the hook-sustaining plate, (see also Fig. 9$^a$,) the recess being of substantially the shape and size of the shoulder 31 of the hook or the part at the inner end of the tubular shank from which starts the neck 7, supporting the head 8 of the hook. This pocket by acting against the circular edge of the shoulder 31 insures the accurate placing of said hook on the hook-sustaining plate in proper position to be set into the stock, leaving the head of the hook always pointed in just the proper direction. The hook-sustaining plate is further shown as notched at its end at 10 to embrace the neck 7 of the hook, while the head 8 thereof below the end of the hook-sustaining plate is contained in the slot or space 5 at the upper end of the plunger. The setting-plate prevents strain exerted in upsetting the tubular shank of the hook to secure the same to the stock from being thrown onto the head of the hook, thus relieving the head of the hook from any strain due to setting the same, which might have a tendency to close the throat of the hook, which is of an established size, as each size of hook is made to take a lacing of an established number or size. The hook-sustaining plate back of the pocket $f^7$ has a hole 62, in which may descend the punch in case the punch should for any reason protrude through the shank of the hook in the act of setting the same in the stock. The depending arm $m^7$ of the hook-sustaining plate has a guide-rod $m^8$, that is free to slide in a transverse hole in the part $m^6$ of the spindle, and an ear $m^9$, extended backwardly from the hook-sustaining plate, has a hole $m^{10}$, (see Fig. 9,) in which is placed a stud 32, that enters the slotted upper end of a lever $n'$, pivoted at $n^2$ on a stud extended through ears of the front covering-plate D, held in place by screws D'. This lever has a tubular portion $n^3$, that receives an adjusting-screw $n^4$ and a spring $n^5$, the spring bearing on a plunger $n^6$, also contained in the tubular portion, the lower end of the plunger resting on a portion of said covering-plate, said spring acting normally to keep the roll $n^7$, carried by said lever, against a cam $n^8$ at the extreme end of the shaft $B^5$. This cam at the proper time contacts with said roller-stud and slides outwardly with relation to the spindle, the hook-sustaining plate withdrawing the same from the throat of the hook in a line at right angles to the longitudinal axis of the plunger, and consequently there is no tendency of the hook-sustaining plate to stick in the throat of the hook or of spreading the throat of the hook as were the sustaining-plate withdrawn from the hook in a circular path. The hooks are spaced uniformly in the two halves $o$ $o'$ of the top of shoe, and to insure this uniform spacing in both halves of the top I employ the gages $e^2$ and $e^3$. The endmost gage $e^2$ farthest from the punch in operation receives in line with it (see Fig. 19) the bottom end of the top or shoe-upper $o'$, said top being, say, for the left-hand side of the shoe, whereas the gage $e^3$, when the hooks are to be set in the right-hand side $o$ of the top, meets the upper edge 35 of the top. (See Fig. 18.) Figs. 18 and 19 show the tops in their engaging positions, and on each top there is shown a circle 36, which represents the point where the punch first meets the stock to punch a hole therein, and thereafter the punch when the slide-frame is moved to enable the punch to feed the stock moves the stock and gages uniformly. The index of the scale $c^{19}$, over which the pointer moves, (see Fig. 2,) is designed to indicate the size length of shoes, and the lever is adjusted to bring the pointer opposite the number of the index representing the size length of the shoe in which the hooks are to be set. It will be understood that the uppermost hook of the top always occupies a position in all lengths of shoes at exactly the same distance from the upper edge of the top, and the lowermost hook or the one next the row of eyelets should occupy a position always at the same distance from the bottom of the top, whatever the number of eyelets set into the top. The gages referred to secure the proper position for either of these extreme hooks, whichever may be set first, and by the adjustment of the feed-regulator the remaining hooks are always set at exactly the proper established distance from the top or bottom hook, that the series of hooks may occupy just the proper positions with relations to the top, no matter what the size length of the shoe.

In operation let it be supposed that one or other top parts $o$ $o'$ are in position. If, for instance, a hook is to be set in the right-hand top, Fig. 19, the bottom end thereof will be placed in line with the edge of gage $e^2$ and the body of the top will be slid under the gage $e^3$. The first hook to be set in the left-hand side of the top is set at the proper distance from the top end of the top, and in setting said hook in said left-hand part of the top the top end thereof is placed against the gage $e^3$, located nearest the punch, said gage being useful only for setting the first hook at the top end of the left-hand side of the top, the proper setting of each second and succeeding hook in the top being insured through the action of the punch and clamp, they operating alternately and feeding the stock automatically for the distance required to accurately space the hooks in the top. Now the punch descends, punches a hole in the stock, and the sliding frame carrying the punch is moved to the left, carrying the stock with it until the punch stops over the longitudinal center of the plunger. Prior to this, however, the hook-feeding device $f^6$ has acted to transfer a hook into the setting-pocket of the hook-sustaining plate, this being done while the hook-sustaining plate and spindle or plunger occupy their lowest positions and while the punch is acting to punch a hole in the stock and feed the same into hook-sustaining position. Now the spindle or plunger and hook-sustaining plate rise, causing the hollow shank of the hook to fit over the exterior of the punch then standing in a hole in the stock $s^{10}$, the end of said punch extending below the surface $f$ constituting the clenching-surface for a distance equal substantially to the thickness of the stock, and in the continued rise of the plunger the hook-sustaining plate carried thereby and engaging the throat of the hook forces the hollow shank of the hook through the stock, said shank surrounding the punch and meeting the clenching-surface $f$, which flares outwardly and lies over against the inner side of the stock then uppermost a part of the shank of the hook, thus upsetting the shank and firmly securing the hook to the stock. This done, the punch rises and the carriage is moved backwardly to its farthest position and the hook-sustaining plate is retracted from the throat of the hook and the plunger is then lowered with the plate into starting position. It will be understood that the gage is necessary only to establish the position of the first hook to be set and on the return of the punch after the first setting operation the punch is moved over the stock held by the presser-foot and the gage is no longer operative to control the position of the stock, for this position is secured wholly by the presser-foot and work-plate which clamps the stock and by the punch which stands in the stock when the presser-foot is lifted from the stock.

The work-support has a finger 40, provided with a hole to receive the shank (see dotted lines, Fig. 14) of a hook-seater 42, held in place by a set-screw 41. The hook-seater is shaped as best shown in Fig. $10^a$, and it occupies such position, Fig. 10, that as the setting-plunger rises, should the hook not be fully on the hook-sustaining plate, the tubular shank of the hook will meet the inclined end 43 of the seater and will crowd the hook firmly onto the end of the hook-sustaining plate and will act as a means for maintaining the hook in setting position on the hook-sustaining plate preparatory to the shank of the hook being passed over the punch to be set in the stock.

I believe that I am the first to produce a hook-setting machine with a punch to punch a hole in the stock, the punch retaining its position in the stock during the feeding of the stock, said machine having a plunger and hook-sustaining plate to control the hook, said parts being so actuated that the punch punches holes in and feeds the stock, and the hook-setting plate by a movement of the plunger passes the hollow shank of the hook through the holes in the stock, outside the punch then occupying a position in the stock, the end of the hook meeting the clenching-surface, flanging or turning outwardly the hollow shank of the hook and setting the same in the stock, and I desire to claim this class of machine broadly.

The short arm of the lever $t$, pivoted at $t'$, has a hole in its longer arm, with which may be connected a rod leading to any usual treadle, so that by turning said lever the rod $e^5$ and presser-foot may be raised for the insertion or removal of work.

The hook-seater 42 herein shown is not herein claimed, as the same has been made the subject-matter of broad claims in another application, Serial No. 226,936, filed October 3, 1904.

Having described my invention, what I claim as new, and desire to secure by Letters Patent, is—

1. In a hook-setting machine, a plunger, and a movable hook-sustaining plate mounted therein and provided at its upper side with a setting-pocket to receive and position the shoulder of the hook to be set, and means to move said hook-sustaining plate laterally with relation to the longitudinal axis of said plunger.

2. In a hook-setting machine, a plunger, a hook-sustaining plate located at the end thereof and guided thereby and provided at its upper side with a setting-pocket to receive, act against and position the shoulder or that part of the hook at the enlarged end of the shank to which is joined the neck of the hook.

3. In a hook-setting machine, a plunger, a hook-sustaining plate movably mounted in said plunger and having at its upper side a raised portion recessed to receive and position the hook, and having a notch in its end to embrace the neck of said hook.

4. In a hook-setting machine, a stock-support, a punch to punch the stock for the reception of the shank of a hook to be set in the stock, means to move the punch to feed the stock, a clenching-surface, combined with a plunger, a hook-sustaining plate carried thereby, means to move said plunger and plate to set the hook carried by said plate, and means to move said plate at right angles to the longitudinal axis of said plunger after the hook has been set.

5. In a hook-setting machine, a plunger having a laterally-movable hook-sustaining plate provided at its upper end with a setting-pocket to receive and position the hook to be set, a punch having a clenching-surface, means for automatically moving said punch to enter and then to feed the stock into setting position.

6. A plunger, a hook-sustaining plate carried thereby, a delivery-raceway for conducting hooks to said hook-sustaining plate, a device, and means to move it to supply hooks to said delivery-raceway one by one and stop the supply of hooks to said raceway when a hook has been improperly lodged therein.

7. In a hook-setting machine, a stock-support, a punch provided with a clenching-surface, means to move said punch to punch a hole in and to feed the stock over the stock-support, combined with a plunger, a hook-sustaining plate carried thereby and means to change the relative position of said plunger with its hook-sustaining plate and said clenching-surface to set in stock a hook sustained by said plate, and means to move said plate at the end of said plunger and substantially at right angles to the longitudinal axis thereof to withdraw said plate from the throat of a set-hook.

8. In a machine of the class described, a delivery-raceway, a separator having a finger to receive the hooks to be delivered to said raceway, a shaft to which said separator is attached, a stop, a dog adjustably mounted on said shaft to provide for locating the finger of the separator correctly in said raceway, means acting normally to retain one end of said dog against said stop and maintain said separator in position to receive a hook, and means acting on said dog to turn the same and the separator to effect the delivery of a hook.

9. In a machine of the class described, a delivery-raceway, a separator having a finger to receive the hook to be delivered to said raceway, a shaft to which said separator is attached, a stop, a dog adjustably mounted on said shaft to provide for locating the finger of the separator correctly in said raceway, and means acting normally to retain one end of said dog against said stop and maintain said separator in position to receive a hook, a lever, and a spring-pressed pawl pivoted on said lever, said pawl when said lever is moved in one direction meeting said dog and turning said separator to deliver a hook.

10. In a machine of the class described, a delivery-raceway, a separator having a finger to receive a hook to be delivered to said raceway, a shaft to which said separator is attached, a stop, a dog adjustably mounted on said shaft to provide for locating the finger of the separator correctly in said raceway, and means acting normally to retain one end of said dog against said stop and maintain said separator in position to receive a hook, and a lever provided with a spring-pressed pawl that is acted upon by the end of the dog to depress said pawl during the backward movement of said lever after having turned the separator.

11. In a machine of the class described, a main raceway, a delivery-raceway, a separator at the junction of said raceways presenting a finger occupying a normal position to receive from the main raceway and sustain a hook, combined with a lever, and a separator-moving pawl movable with said lever, a spring acting against said pawl, and an adjusting device to determine the extent of movement of said pawl by said spring.

12. In a machine for setting lacing-hooks, a hopper, a rotatable lifter therein for selecting hooks from a mass of hooks, a raceway upon which said rotatable lifter delivers lacing-hooks, means to move said lifter forwardly and to return the same automatically to its starting-point should its forward movement have been obstructed by a lodged hook.

13. In a machine for inserting lacing-hooks, a raceway, a hopper, a series of blades to pick up hooks contained in said hopper, means to bring the blades in register with said raceway and to turn said blades backwardly should the forward movement of a blade be obstructed by a hook lodged between a blade and the raceway.

14. In a machine of the class described, a raceway, a hook-lifter having a ratchet-wheel provided with notches, a toothed pawl-carrier having a pawl to engage the notches of said ratchet-wheel, a rack in engagement with the teeth of said pawl-carrier, a lever, means to move said lever, and a spring connecting said lever with said rack and moving the latter in a direction to turn the hook-lifter in a direction to deliver to said raceway the hooks sustained thereby, said spring being adapted to yield when the movement of the lifter is obstructed to obviate breaking the machine.

15. In a machine of the class described, a raceway, a hook-lifter having a ratchet-wheel provided with notches, a toothed pawl-carrier having a pawl to engage the notches of said ratchet-wheel, a rack in engagement with the teeth of said pawl-carrier, a lever, means to move said lever, a spring connecting said lever with said rack and moving the latter in a direction to turn the hook-lifter in a direction to deliver to said raceway the hooks sustained thereby, and means coacting with said pawl at the end of each forward stroke of the pawl-carrier to release said pawl from the notch of the ratchet-wheel that the pawl-carrier and pawl may be moved backwardly.

16. In a machine of the class described, a raceway, a hook-lifter having a ratchet-wheel provided with notches, a toothed pawl-carrier having a pawl to engage the notches of said ratchet-wheel, a slotted rack in engagement with the teeth of said pawl-carrier, a lever having a pin entering the slot of said rack, a spring connecting said lever with said rack, means to move said lever in one direction that the spring connected therewith may move the rack to turn the hook-lifter to deliver hooks to said raceway, said spring yielding and permitting the rack-bar to stop when the movement of the lifter is obstructed by a hook, the pin of said lever, when the latter is moved in an opposite direction, meeting one end of the slot in said rack-bar and causing the pawl when in engagement with a notch of said ratchet-wheel to turn the same and the lifter backwardly as and for the purpose described.

17. In a machine of the class described, a hopper having a passage for the delivery of hooks, a rotatable hook-lifter, a raceway to which the hook-lifter delivers hooks, a ratchet-wheel fast on the axis of said hook-lifter, a pawl-carrier, a pawl having a lug engaging a notch in said ratchet-wheel, means to release said pawl, and yielding means for actuating said pawl-carrier whereby in case of clogging of the lifter by a hook the pawl will stop short of making its full stroke and will remain in engagement with the notch of the ratchet-wheel during the back stroke of the pawl and pawl-carrier, said pawl moving backwardly with it the ratchet-wheel and the hook-lifter that the obstruction may be removed.

18. In a machine of the class described, a hopper, a hook-lifter, a shaft sustaining the same, a pawl-carrier mounted loosely on said shaft, yielding actuating means for said pawl-carrier, a pawl mounted on said carrier, a ratchet-wheel fixed to said shaft and having notches to be engaged by said pawl, and a device to lift and disengage said pawl from the notches of said wheel only after the pawl-carrier has been moved for its full feeding stroke.

19. In a machine of the class described, a lacing-hook lifter having an attached ratchet-wheel provided with notches, combined with actuating means therefor comprising a pawl and pawl-carrier, a rack connected therewith, a spring connected with said rack, a lever joined with said spring, and means to move said lever said spring permitting the pawl-carrier to be arrested when the lifter is clogged but without stopping said lever.

20. In a machine of the class described, a lifter for lacing-hooks, and a shaft to which said lifter is connected, combined with actuating means therefor comprising a pawl-carrier and pawl, a ratchet-toothed wheel fixed to the shaft carrying the lifter, and yielding means for actuating said pawl-carrier and pawl that their movement may be arrested whenever the lifter is clogged by a hook, said pawl at such time retaining its engagement with the ratchet-wheel, and turning said lifter backwardly that the lacing-hook which clogged the lifter may be removed therefrom.

21. In a machine of the class described, a punch and set, means to move the same laterally to feed the stock, combined with a top end gage movable longitudinally therewith during the feeding operation.

22. In a machine of the class described, a punch and set, and means to move the same laterally to feed the stock combined with a top end gage adjustable with relation to said punch and set and movable longitudinally therewith in the operation of feeding the stock.

23. In a machine of the class described, a punch and set, a slide carrying said punch and set, means to move the punch in the slide, means to move the slide while the punch is in the stock that the latter may feed the stock, and two end gages carried by and movable with said slide as the punch is moved to feed the stock.

24. In a hook-setting machine, stock-feeding means and connected end gages movable therewith and determining the position of the stock prior to the engagement of the stock by the stock-feeding means.

25. In a hook-setting machine, a stock-support, a punch-bar having a punch for feeding the stock, a slide sustaining a punch-bar, means to move the punch-bar to enter the stock to feed the same, means to move the slide horizontally that the punch may feed the stock, and an end gage movable with the slide and punch as the latter feeds the stock.

26. In a hook-setting machine, a stock-support, a punch, means to move the same vertically and horizontally, and two end gages movable horizontally with said punch and determining the position of the shoe-upper on the stock-support prior to the action of the punch in feeding the stock.

27. In a machine for setting lacing-hooks, stock-feeding means including a sliding frame, an end gage movable longitudinally with said frame during the feeding of the stock, and devices to adjust the feeding stroke of the stock-feeding means and gage to the size number of the shoe, that the bottom and top hooks of a series of hooks may be properly set irrespective of the length or size of the shoe.

28. In a hook-setting machine, a stock-support, a clamping-foot, means to move it to clamp and release the stock, a punch, a carrying-slide therefor, means to actuate the punch in said slide to punch a hole in the stock while the latter is clamped on the stock-support, means to move said slide and punch laterally while the stock is unclamped that the punch may move the stock over the work-support, a plunger having means to sustain the hook to be set, actuating means for said plunger, and an end gage carried by said slide, to operate substantially as described.

29. In a hook-setting machine, a stock-support, a clamping-foot, means to move it to clamp and release the stock, a punch, a carrying-slide therefor, means to actuate the punch in said slide to punch a hole in the stock while the latter is clamped on the stock-support, means to move said slide and punch laterally while the stock is unclamped that the punch may move the stock over the work-support, a plunger having means to sustain the hook to be set, actuating means for said plunger, and two end gages carried by said slide, one being adjustable with relation to the other and operating substantially as described.

In testimony whereof I have signed my name to this specification in the presence of two subscribing witnesses.

PERLEY R. GLASS.

Witnesses:
GEO. W. GREGORY,
EDITH M. STODDARD.